(12) United States Patent
Imai

(10) Patent No.: US 7,069,754 B2
(45) Date of Patent: Jul. 4, 2006

(54) STEERING LOCK DEVICE

(75) Inventor: Seishi Imai, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 106 days.

(21) Appl. No.: 10/820,104

(22) Filed: Apr. 8, 2004

(65) Prior Publication Data
US 2004/0206139 A1    Oct. 21, 2004

(30) Foreign Application Priority Data
Apr. 15, 2003    (JP)    ............................. 2003-110154

(51) Int. Cl.
*B60R 25/02* (2006.01)

(52) U.S. Cl. .......................................... 70/186; 70/252

(58) Field of Classification Search .......... 70/182–186, 70/252
See application file for complete search history.

(56) References Cited

U.S. PATENT DOCUMENTS

| | | | | |
|---|---|---|---|---|
| 3,914,967 A * | 10/1975 | Arman | ......................... | 70/252 |
| 3,959,996 A * | 6/1976 | Thirion | ........................ | 70/186 |
| 4,179,908 A * | 12/1979 | Schaumburg | ................ | 70/185 |
| 4,309,882 A * | 1/1982 | Maiocco | ...................... | 70/186 |
| 4,332,306 A * | 6/1982 | Turatti | ....................... | 180/287 |
| 4,466,262 A * | 8/1984 | Maiocco et al. | ............... | 70/252 |
| 4,685,313 A * | 8/1987 | Neyret | ........................ | 70/186 |
| 5,595,079 A * | 1/1997 | Myers | ......................... | 70/233 |
| 5,634,358 A * | 6/1997 | Myers | ......................... | 70/233 |
| 6,003,349 A * | 12/1999 | Nagae et al. | .................. | 70/186 |
| 6,349,579 B1 * | 2/2002 | Canard | ........................ | 70/186 |
| 6,508,088 B1 * | 1/2003 | Barbier et al. | ................ | 70/186 |

FOREIGN PATENT DOCUMENTS

| | | |
|---|---|---|
| DE | 199 03 083 A1 | 5/1999 |
| EP | 0 365 423 | 4/1990 |
| EP | 0999968 | 5/2000 |
| FR | 2.038.607 | 8/1971 |
| JP | 2000-211479 | * 8/2000 |

OTHER PUBLICATIONS

European Search Report dated Aug. 12, 2005, for Application No. FR 0403666.

* cited by examiner

*Primary Examiner*—Suzanne Dino Barrett
(74) *Attorney, Agent, or Firm*—Thomas W. Cole; Nixon Peabody LLP (57) ABSTRACT

In a steering lock device, a lock bar is disposed so as to be offset parallel to a key cylinder along a longitudinal direction of a vehicle (i.e., a central axis of the lock bar and a central axis of the key cylinder are parallel), and is disposed so as to be adjacent to the key cylinder along the central axis of the key cylinder. Further, a proximal end of the lock bar and a rear end of the key cylinder are disposed so as to overlap one another. In accordance with the steering lock device, an amount of projection from a steering column (i.e., a rectilinear distance from an outer peripheral surface of the steering column to a center of a key insertion opening of a key rotor) can be kept small. Degrees of freedom in design of an outer shape of a column cover are thereby increased.

17 Claims, 7 Drawing Sheets

FRONT OF VEHICLE

REAR OF VEHICLE

STEERING LOCK DEVICE

CROSS-REFERENCE TO RELATED APPLICATION

This application claims priority under 35 USC 119 from Japanese patent application, No. 2003-110154, the disclosure of which is incorporated by reference herein.

BACKGROUND OF THE INVENTION

1. Field of the Invention

The present invention relates to a steering lock device which is applied to a vehicle such as an automobile or the like.

2. Description of the Related Art

Vehicles such as automobiles and the like are equipped with, as an antitheft device, a so-called steering lock device which is mounted to, for example, the steering column of the vehicle.

In a conventional steering lock device, for example, a key rotor of a key cylinder, and a lock bar which locks the steering shaft, are structured so as to be mechanically interlocked via a gear or the like. The key cylinder, the lock bar, the gear, and the like are disposed coaxially in a direction intersecting the axial direction of the steering column. Therefore, the steering lock device itself projects out greatly from the steering column, and a problem arises in that there are many constraints on the design of the outer shape of the column cover which covers the periphery of the steering column.

On the other hand, there is also a steering lock device of a type in which the key cylinder and the lock bar are disposed parallel (see, for example, Japanese Patent Application Laid-Open (JP-A) No. 2000-211479). However, in the steering lock device disclosed in this JP-A No. 2000-211479, the key cylinder is disposed further toward the side opposite the steering column than the proximal end portion of the lock bar. Therefore, the amount by which the steering lock device projects out from the steering column on the whole is large, and a problem arises in that there are many constraints on the design of the outer shape of the column cover.

SUMMARY OF THE INVENTION

The present invention has been made in view of the aforementioned circumstances and provides a steering lock device which, by keeping the amount by which the steering lock device projects out from a steering column small, increases the degrees of freedom in designing the outer shape of a column cover.

In order to achieve this, in a first aspect of the present invention, a steering lock device comprises: a key cylinder which has a key rotor rotated by a key, and which is accommodated within a lock body mounted to a steering column of a vehicle; and a lock bar accommodated within the lock body, and moved, by rotation of the key rotor, between a locking position at which the lock bar locks a steering shaft, and an unlocking position at which the lock bar cancels the locking, wherein the lock bar is offset parallel to a central axis of the key cylinder, and is disposed at a key cylinder side along the central axis of the key cylinder.

In the steering lock device of the present aspect, the key cylinder is accommodated within the lock body which is mounted to the steering column of the vehicle. The lock bar, which is moved by rotation of the key rotor of the key cylinder between the locking position at which the lock bar locks the steering shaft and the unlocking position at which the lock bar cancels the locking, is offset parallel to the central axis of the key cylinder. Further, the lock bar is disposed at the key cylinder side (adjacent to the key cylinder) along the central axis of the key cylinder.

Accordingly, in accordance with the steering lock device of the present aspect, the amount of projection thereof from the steering column can be kept small, as compared with a conventional steering lock device in which the key cylinder and the lock bar are disposed in a coaxial state in a direction intersecting the axial direction of the steering column. The degrees of freedom in designing the outer shape of the column cover are thereby increased.

Further, in accordance with the steering lock device of the present aspect, the space in the vicinity of the steering column mounting position, which space cannot be effectively utilized in the conventional steering lock device, can be utilized effectively without waste. In this way, the structural members of the steering lock device do not project into the space within the vehicle compartment and do not encroach unnecessarily on the space within the vehicle compartment, and the degrees of freedom in arranging the structural members are increased.

In this way, in accordance with the steering lock device based on the present aspect, the degrees of freedom in the design of the outer shape of the column cover are increased by keeping the amount of projection of the steering lock device from the steering column small.

In a second aspect of the present invention, a gear, which rotates integrally with the key rotor, is directly supported at the lock body.

In the steering lock device of the present aspect, the gear, which rotates integrally with the key rotor and moves the lock bar, is supported directly at the lock body. Accordingly, a member (a holder) which is needed in order to support the gear at the lock body in the conventional steering lock device can be done away with. Accordingly, the number of parts is reduced, and the cost is reduced.

In a third aspect of the present invention, an ignition switch, which is operated by the gear which rotates integrally with the key rotor, is provided at a side of the key cylinder which side is opposite the lock bar along a vehicle longitudinal direction.

In accordance with the steering lock device of the present aspect, the ignition switch, which is operated by the gear which rotates integrally with the key rotor, is provided at a side of the key cylinder which side is opposite the lock bar along the vehicle longitudinal direction. Namely, the ignition switch, the key cylinder, and the lock bar are disposed adjacent along the longitudinal direction of the vehicle.

Namely, the respective structural members of the steering lock device can be disposed efficiently in the space in the vicinity of the steering column mounting position, which space is not utilized efficiently in the conventional steering lock device.

Accordingly, in accordance with the steering lock device of the present aspect, the ignition switch does not project out into the vehicle compartment, and does not needlessly encroach on the space within the vehicle compartment. Further, there are no constraints on the design of the outer shape of the column cover due to projecting-out of the ignition switch.

BRIEF DESCRIPTION OF THE DRAWINGS

FIGS. 5A through 5C show the structure of a gear which is a structural member of the steering lock device relating to the embodiment of the present invention, where

DETAILED DESCRIPTION OF THE INVENTION

Figure 3:
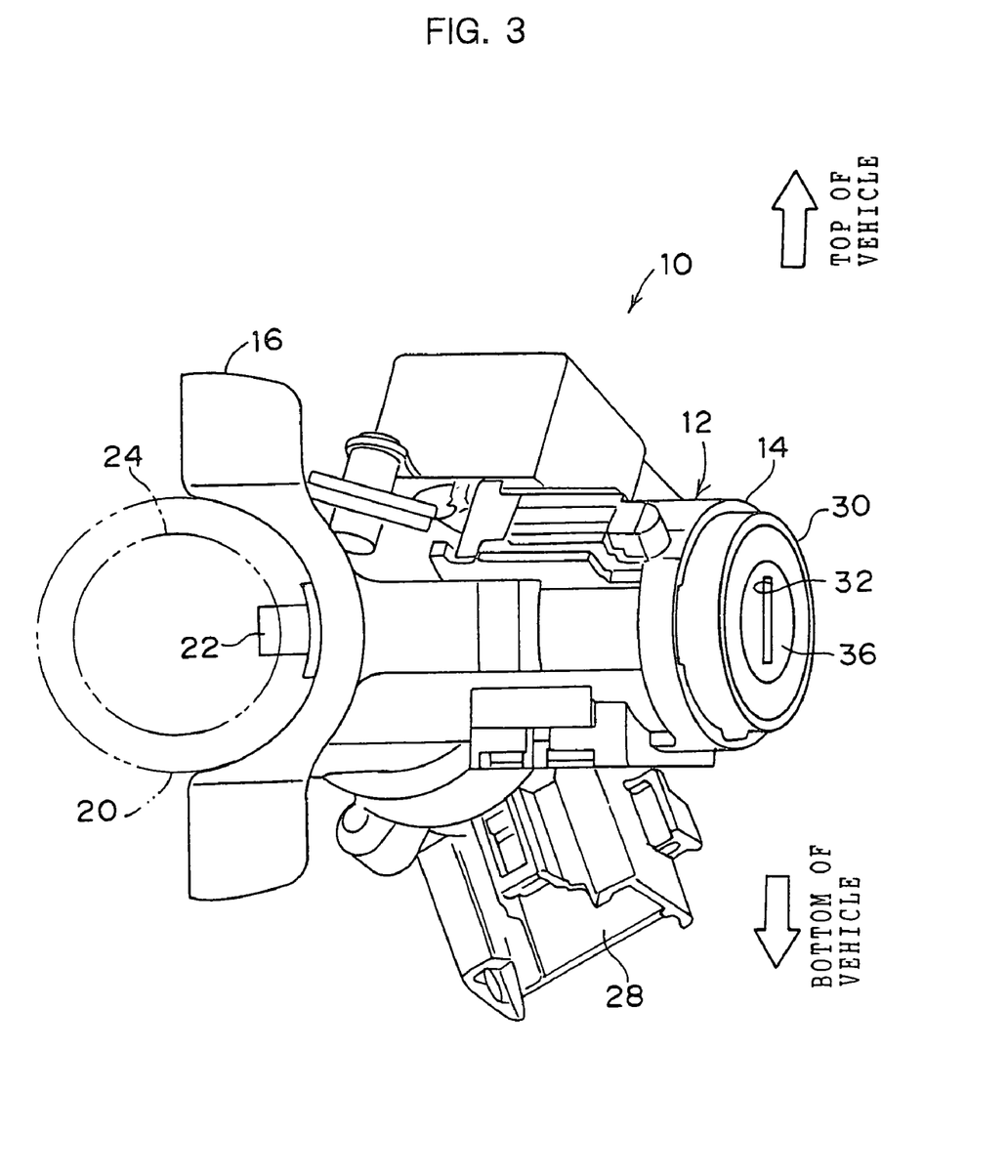
FIG. 3 is a front view showing the structure of the steering lock device relating to the embodiment of the present invention.
Figure 4:
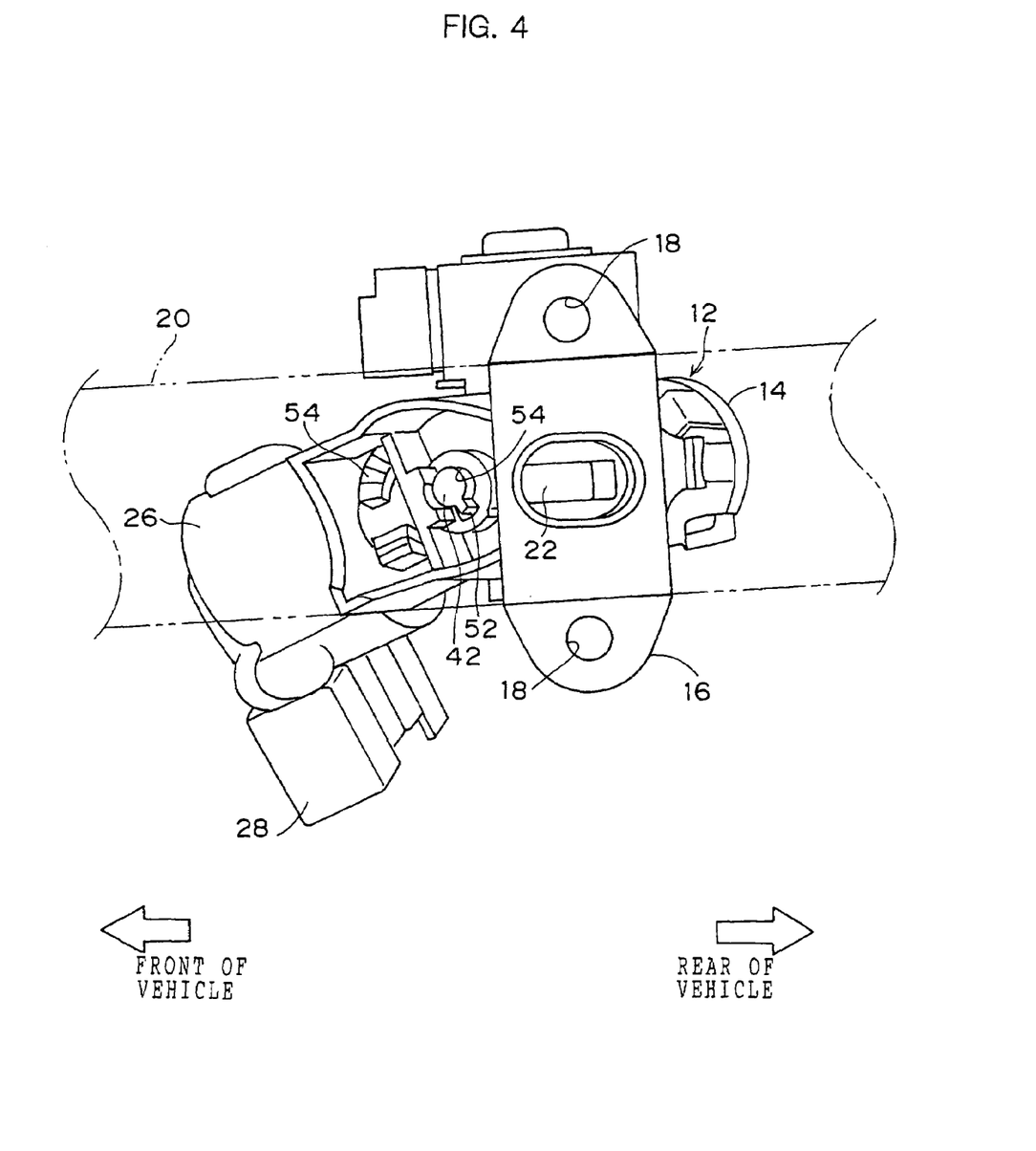
FIG. 4 is an end view showing the structure of the steering lock device relating to the embodiment of the present invention.

The structure of a steering lock device 10 relating to an embodiment of the present invention is shown in front view in FIG. 3. An end view of the steering lock device 10 relating to the embodiment of the present invention is shown in FIG. 4.

As shown in these figures, the steering lock device 10 has a lock body 12. The lock body 12 has a housing portion 14 and a mounting portion 16 which are formed integrally. The housing portion 14 is formed of a metal such as aluminum, and is formed in the shape of a hollow cylinder having a floor. The mounting portion 16 is formed so as to project from a portion of the floor side of the housing portion 14 (i.e., the left side in FIG. 3), in a state of being inclined at a predetermined angle with respect to the central axis of the housing portion 14.

The lock body 12 is mounted to a steering column 20 of the vehicle by mounting bolts (not illustrated) being screwed into mounting holes 18 formed at the mounting portion 16.

In the state in which the lock body 12 is mounted to the steering column 20, a lock bar 22, which will be described later and which projects from the substantially central portion of the mounting portion 16, engages with a concave portion (not illustrated) of a steering shaft 24 (which is not shown in FIG. 4).

Figure 1:
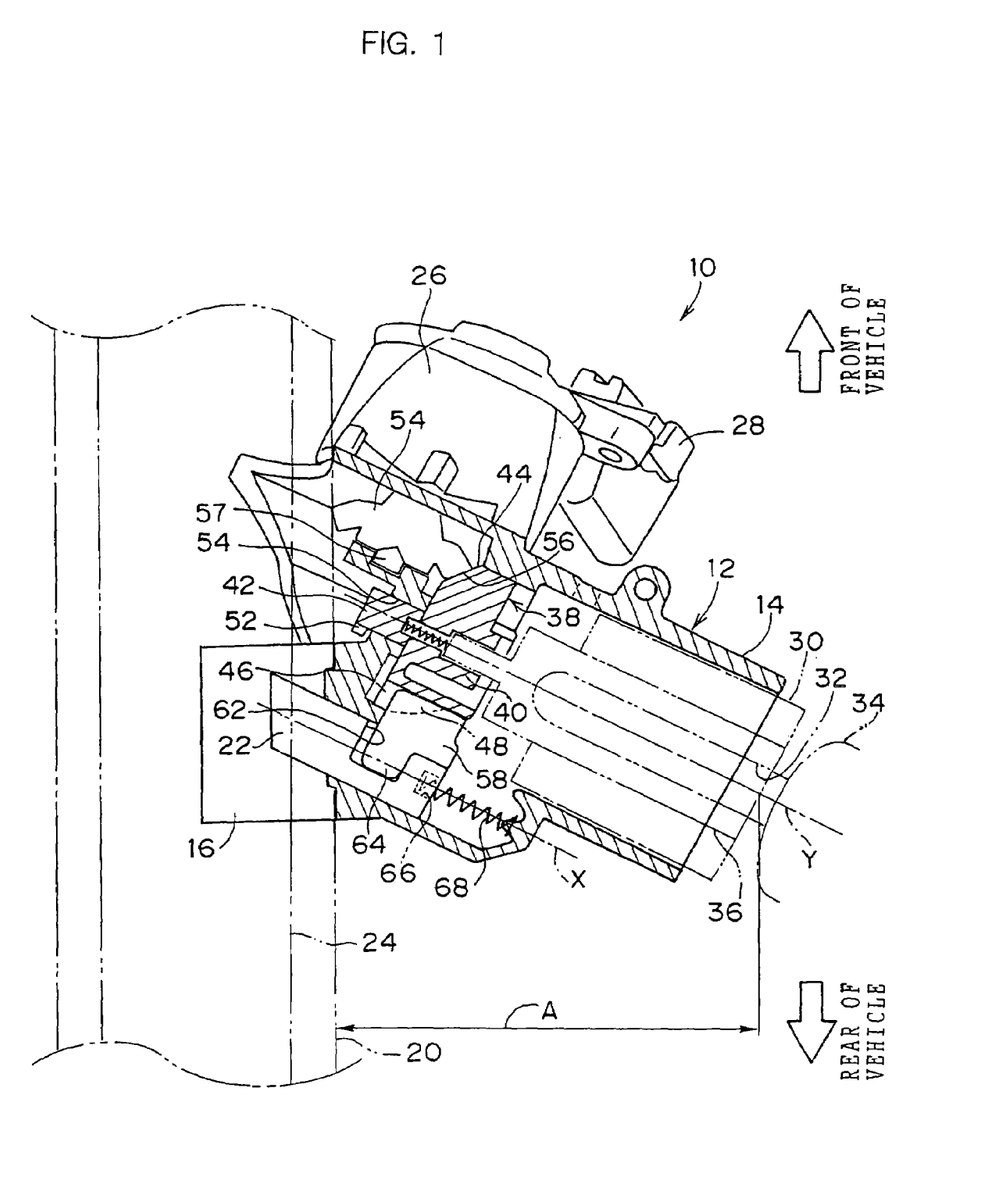
FIG. 1 is a lateral sectional view showing the structure of main portions of a steering lock device relating to an embodiment of the present invention, and showing a state in which a lock bar is positioned at a locking position.

The structure of the main portions of the steering lock device 10 is shown in a lateral sectional view in FIG. 1.

As shown in FIG. 1, at the vehicle front side and at the steering column 20 side of the lock body 12, an ignition switch 26 which is a rotary switch is fixed to the lock body 12 by unillustrated screws. The ignition switch 26 has a connector 28 formed integrally therewith. Due to another connector, which is not illustrated, being connected to this connector 28, the ignition switch 26 is connected to an unillustrated control circuit provided in the vehicle via an unillustrated wire provided in the vehicle.

A cylindrical key cylinder 30 is provided at the interior of the housing portion 14 of the lock body 12. Although not illustrated, the key cylinder 30 is fixed to the lock body 12 so as to be unable to be taken-out from the exterior of the lock body 12. A key insertion opening 32 (see FIG. 3) is formed in a key rotor 36 of the key cylinder 30. The key rotor 36 is rotated by a predetermined angle due to a key 34, which is inserted in from the key insertion opening 32, being rotated. A gear 38, which is a bevel gear, is engaged with the key rotor 36 of the key cylinder 30, such that the gear 38 and the key rotor 36 rotate integrally.

Figure 5A:
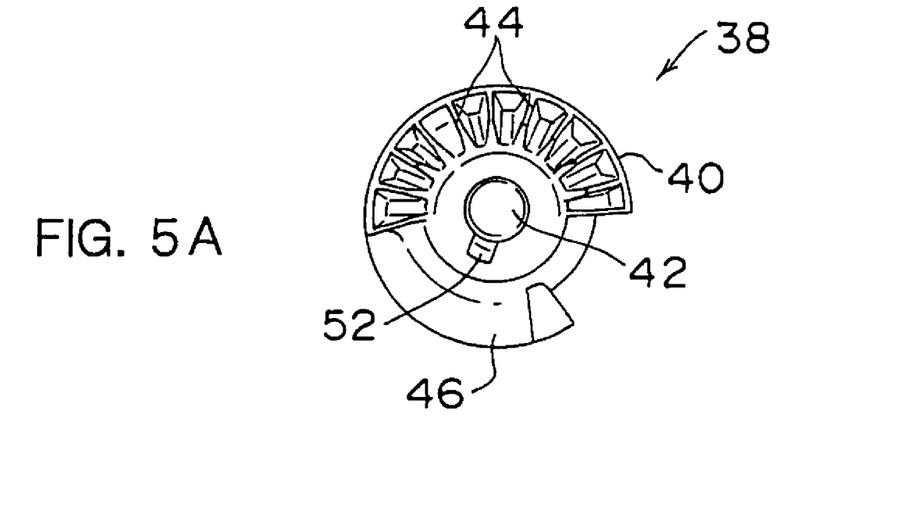
FIG. 5A is a top view.
Figure 5B:
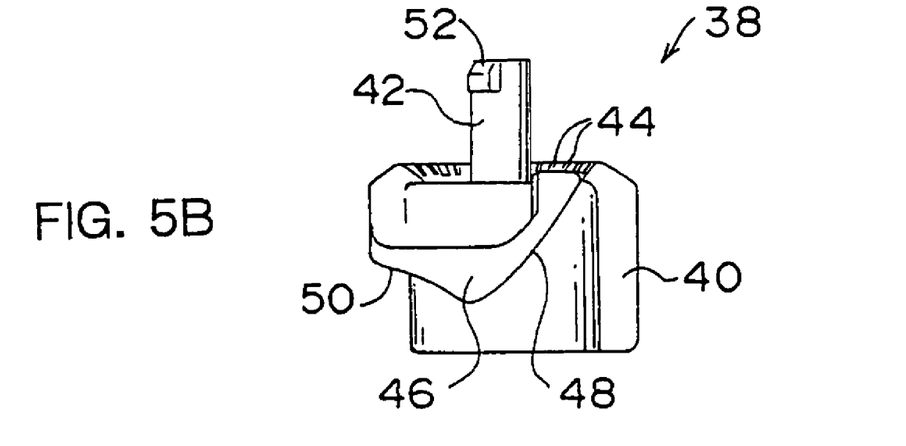
FIG. 5B is a side view.
Figure 5C:
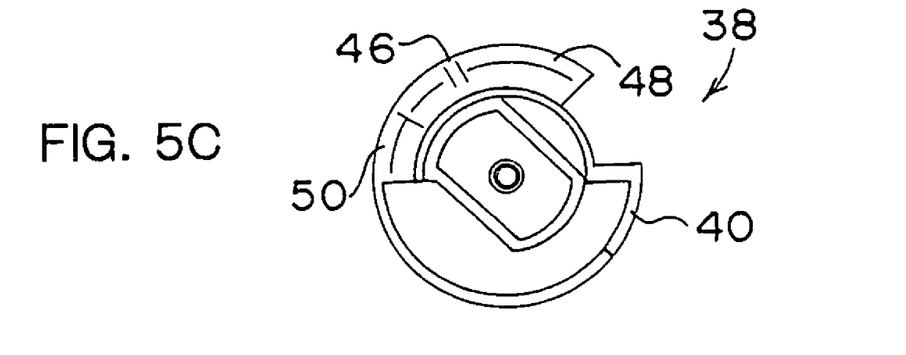
FIG. 5C is a bottom view.

As shown in FIGS. 5A through 5C, the gear 38 is formed by a main body portion 40 and a pivot shaft 42. Teeth 44 are formed at the distal end portion of the main body portion 40 (the upper end portion in FIG. 5B), at a region occupying about half of the outer peripheral edge portion of the main body portion 40. An engaging portion 46, which projects from the outer periphery of the main body portion 40, is formed at the side of the main body portion 40 at which the teeth 44 are not formed.

An inclined surface 48, which is inclined at a predetermined angle with respect to the axial direction of the gear 38, is formed at one side of the engaging portion 46 (the right side in FIG. 5B). One end portion of the inclined surface 48 (the lower end portion in FIG. 5B) is connected to a holding surface 50 of the engaging portion 46. The portion where the inclined surface 48 and the holding surface 50 are connected is formed so as to project slightly toward the proximal end side (the lower side in FIG. 5B) of the gear 38.

The pivot shaft 42, which is shaped as a solid cylinder, is formed so as to project coaxially to the main body portion 40 at the center of the distal end portion of the main body portion 40 of the gear 38. A convex portion 52, which projects out in the radial direction of the pivot shaft 42, is formed at the distal end of the pivot shaft 42. As shown in FIG. 1, the gear 38 is rotatably supported at the lock body 12 due to the pivot shaft 42 being inserted through a through hole 54 formed in the floor wall of the housing portion 14 of the lock body 12, and the convex portion 52 engaging with the edge of the through hole 54.

As shown in FIG. 1, teeth 56 of a gear 54, which also is a bevel gear, mesh with the teeth 44 of the gear 38 at the ignition switch 26 sides thereof. The gear 54 is disposed such that the central axis thereof is orthogonal to the central axis of the gear 38. A shaft 57, which switches a contact of the ignition switch 26, is fit into the center of the gear 54. Due to the gear 54 being rotated due to the rotation of the gear 38, the shaft 57 of the ignition switch 26 is rotated, and the contact of the ignition switch 26 is switched.

At the vehicle rear side of the gear 38, a slider 58, which is formed of metal and substantially in the form of an L-shaped block, contacts the inclined surface 48 of the engaging portion 46 of the gear 38. The lock bar 22 is disposed at the vehicle rear side of this slider 58. The lock bar 22 is formed in the shape of a rod whose cross-section is substantially rectangular. A projecting portion 64 of the slider 58 engages with a groove 62 which is formed in the longitudinal direction intermediate portion of the lock bar 22.

A circular hole 66 is formed in the proximal end portion of the lock bar 22 (the right side end portion in FIG. 1). A coil spring 68 is disposed between the circular hole 66 and an inner wall of the lock body 12. The lock bar 22 is always urged toward the steering shaft 24 side.

The distal end portion of the lock bar 22 (the left side end portion in FIG. 1) is formed so as to be inclined at a predetermined angle with respect to a central axis X of the lock bar 22. This distal end portion engages with the unillustrated concave portion of the steering shaft 24.

The lock bar 22 is held at the lock body 12 so as to be movable along the inner wall of the lock body 12 between a locking position (the state shown in FIG. 1) at which the lock bar 22 locks the steering shaft 24, and an unlocking position (the state shown in FIG. 2) at which the lock bar 22 releases the locking of the steering shaft 24.

Here, as shown in FIG. 1, in the state in which the lock body 12 is mounted to the steering column 20, the lock bar 22 is offset along the longitudinal direction of the vehicle, parallel to the key cylinder 30 (the central axis X of the lock bar 22 and a central axis Y of the key cylinder 30 are parallel), and is disposed adjacent to the key cylinder 30 along the central axis Y of the key cylinder 30. Further, the proximal end of the lock bar 22 and the rear end of the key cylinder 30 (the left side end portion in FIG. 1) are disposed so as to overlap one another.

The ignition switch 26 is disposed at the side of the key cylinder 30, which side is opposite the lock bar 22 along the longitudinal direction of the vehicle, (i.e., the ignition switch 26 is disposed at the vehicle front side of the key cylinder 30).

Next, operation of the present embodiment will be described.

In the steering lock device 10 having the above-described structure, in the state in which the lock bar 22 is engaged with the steering shaft 24 (i.e., in the state shown in FIG. 1), the key rotor 36 of the key cylinder 30 is positioned at the "LOCK" position. Then, when the key 34 is inserted into the key insertion opening 32 of the key rotor 36 and rotates the key rotor 36 to an operation position (the "ACC", "ON" or "START" position), the shaft 57 of the ignition switch 26 is rotated via the gear 54 by the gear 38 which rotates integrally with the key rotor 36.

Figure 2:
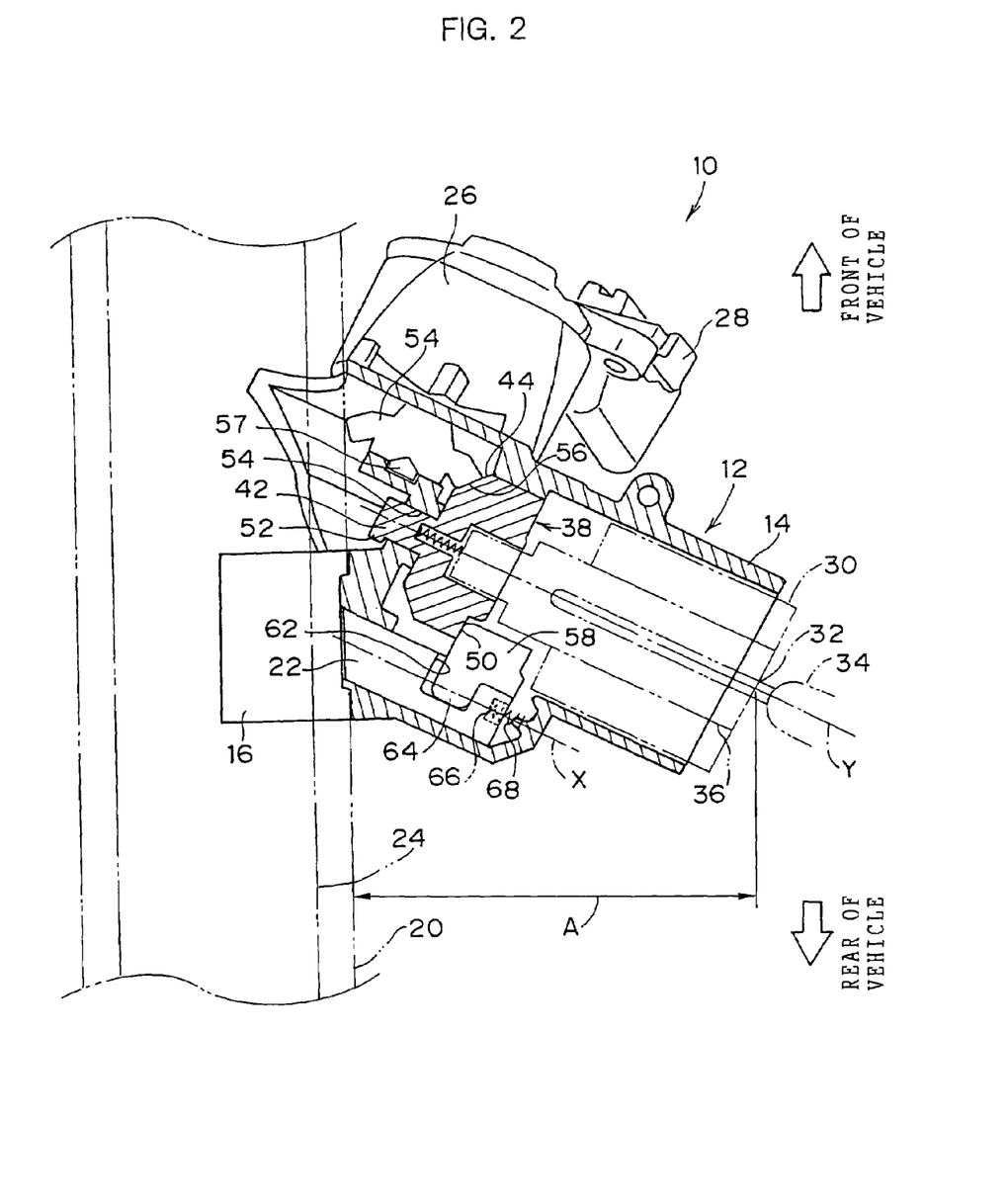
FIG. 2 is a lateral sectional view showing the structure of main portions of the steering lock device relating to the embodiment of the present invention, and showing a state in which the lock bar is positioned at an unlocking position.

At this time, due to the rotation of the gear 38, the slider 58, which contacts the inclined surface 48 of the engaging portion 46 of the gear 38, slides along the inclined surface 48 and is moved to the side opposite the steering shaft 24 (i.e., is moved toward the right in FIG. 1). Therefore, the lock bar 22, with whose groove 62 the projecting portion 64 of the slider 58 is engaged, is moved toward the side opposite the steering shaft 24 against the urging force of the coil spring 68. Then, as shown in FIG. 2, when the slider 58 reaches the holding surface 50 of the engaging portion 46 of the gear 38, the locking of the steering shaft 24 by the lock bar 22 is completely released, and the lock bar 22 is held at the lock releasing position by the slider 58.

Note that, at the engaging portion 46 of the gear 38, the portion where the inclined surface 48 and the holding surface 50 are connected projects toward the proximal end side of the gear 38 (see FIG. 5B). Therefore, the slider 58 which is held at the holding surface 50 can be prevented from moving toward the inclined surface 48 side at times when such movement is unnecessary. In this way, the lock bar 22 can be prevented from projecting toward the steering shaft 24 side at times when such projection is unnecessary.

On the other hand, in the state in which the lock bar 22 has been moved to the lock releasing position (the state shown in FIG. 2), when the key 34 which is inserted in the key insertion opening 32 of the key rotor 36 is rotated to the "LOCK" position, the gear 38 rotates integrally with the key rotor 36, and the slider 58 moves from the holding surface 50 of the engaging portion 46 of the gear 38 to the inclined surface 48 of the engaging portion 46. Therefore, the lock bar 22 moves, together with the slider 58, toward the steering shaft 24 side due to the urging force of the coil spring 68. In this way, the lock bar 22 engages with the unillustrated concave portion of the steering shaft 24, and the steering shaft 24 is locked.

Figure 6:
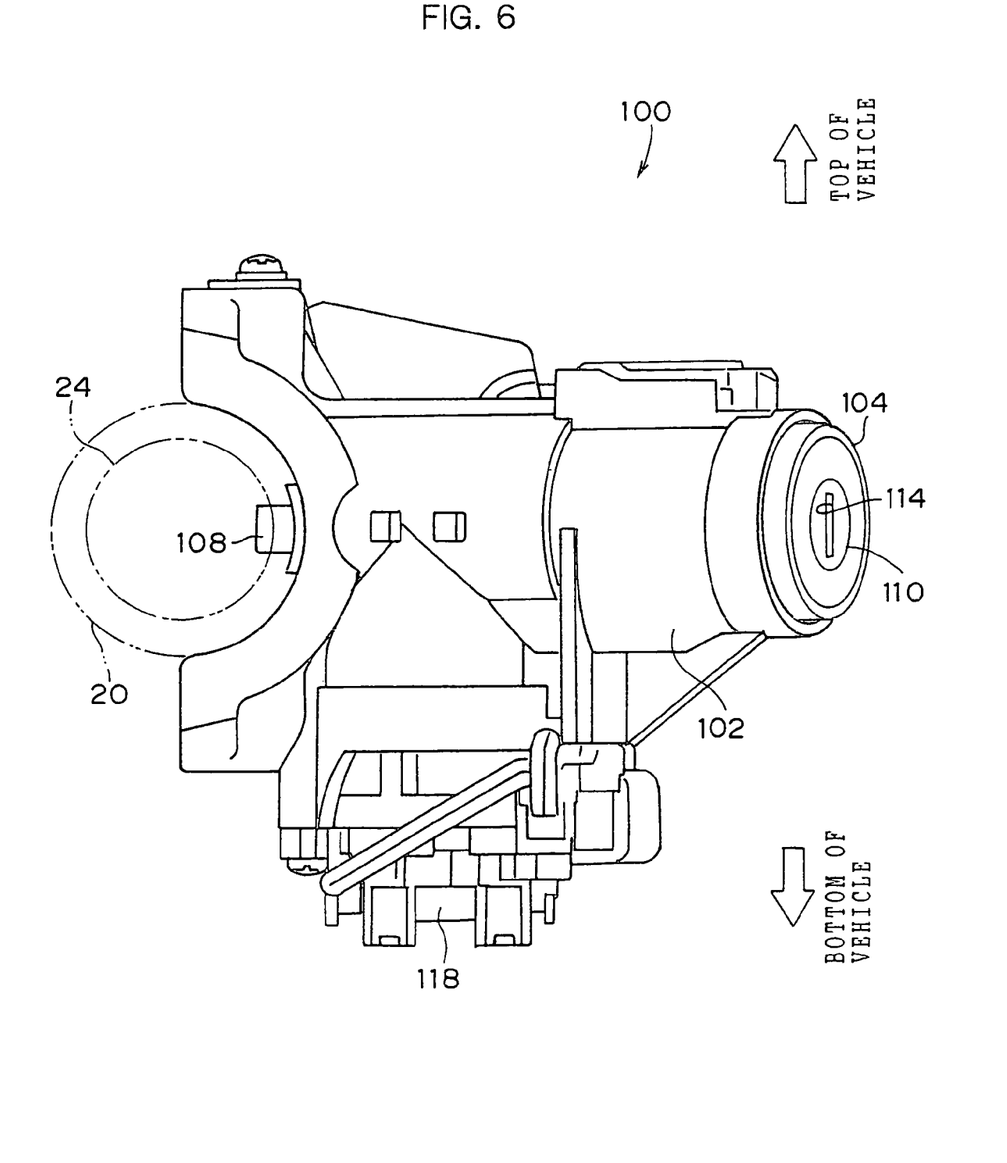
FIG. 6 is a front view showing the structure of a conventional steering lock device.
Figure 7:
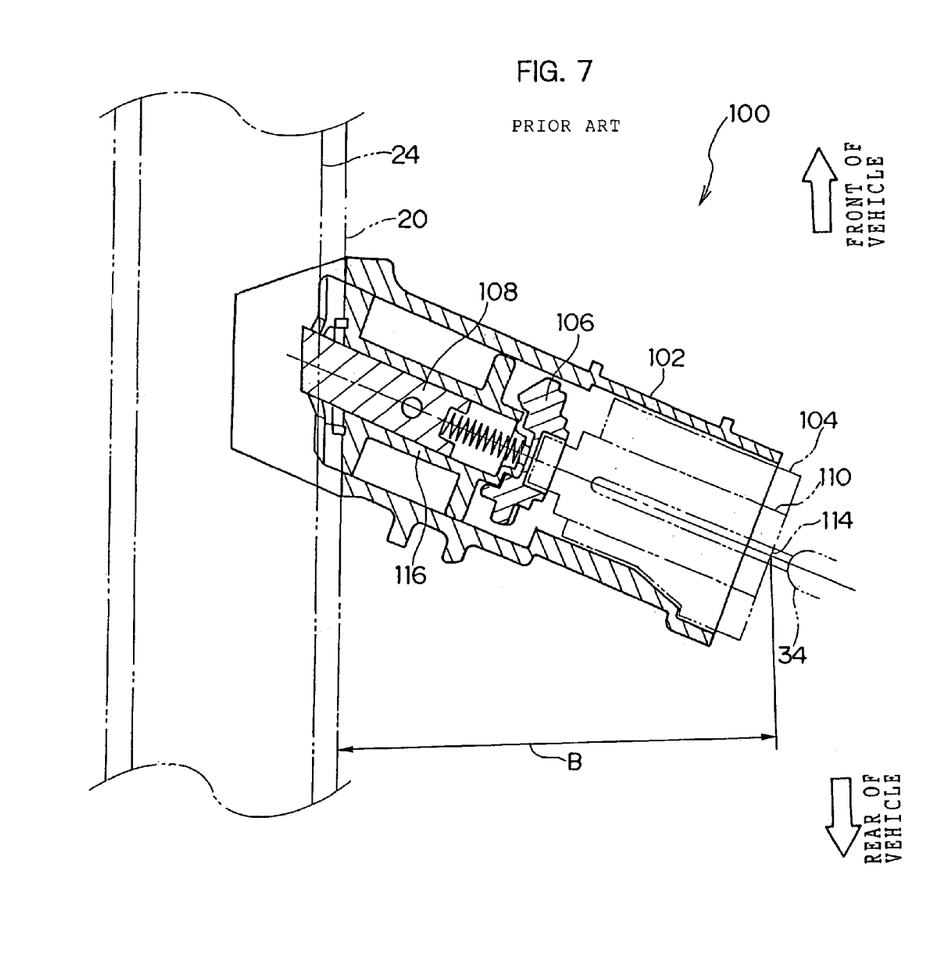
FIG. 7 is a lateral sectional view showing the structure of main portions of the conventional steering lock device.

In a conventional steering lock device 100 shown in FIGS. 6 and 7, a key cylinder 104, a gear 106, and a lock bar 108 are disposed coaxially within a hollow-cylindrical lock body 102. Therefore, an amount of projection B of the steering lock device 100 from the steering column 20 (i.e., the rectilinear distance from the outer peripheral surface of the steering column 24 to the center of a key insertion opening 114 formed in a key rotor 110) is large (e.g., about 90 mm), and there is the problem that there are many constraints on the design of the outer shape of the column cover which covers the periphery of the steering column 20.

In contrast, in the steering lock device 10 relating to the present embodiment, as shown in FIG. 1 or FIG. 2, the lock bar 22 is offset along the longitudinal direction of the vehicle, parallel to the key cylinder 30 (the central axis X of the lock bar 22 and the central axis Y of the key cylinder 30 are parallel), and is disposed adjacent to the key cylinder 30 along the central axis Y of the key cylinder 30. Further, the proximal end of the lock bar 22 and the rear end of the key cylinder 30 are disposed so as to overlap one another.

Accordingly, in the present steering lock device 10, an amount of projection A from the steering column 20 (i.e., the rectilinear distance from the outer peripheral surface of the steering column 24 to the center of the key insertion opening 32 of the key rotor 36) can be kept small (e.g., about 70 mm in the present embodiment). The degrees of freedom in designing the outer shape of the column cover are thereby increased.

In this way, in the steering lock device 10 having the above-described structure, by keeping the amount of projection A from the steering column 20 small, the degrees of freedom in designing the outer shape of the column cover are increased.

Further, in the present steering lock device 10, the space, which is in the vicinity of the position where the steering lock device 10 is mounted to the steering column 24 and which cannot be effectively utilized in the conventional steering lock device 100, can be utilized effectively without waste. In this way, the structural members of the steering lock device 10 do not project out into the space within the vehicle compartment and do not needlessly encroach on the space within the vehicle compartment, and the degrees of freedom in arranging the respective structural members can be increased.

Further, the gear 38 is directly supported at the lock body 12 by the pivot shaft 42 which is inserted through the through hole 54 of the lock body 12. It is thereby possible to do away with a holder 116 which is a member for supporting the gear 106 and the lock bar 108 at the lock body 102 in the conventional steering lock device 100. In this way, the number of parts can be reduced, and costs can be lowered.

As shown in FIG. 6, in the conventional steering lock device 100, an ignition switch 118 is disposed at the vehicle lower side or the like of the key cylinder 104. Therefore, constraints on the design of the outer shape of the column cover arise due to the projecting-out of the ignition switch 118.

In contrast, in the present steering lock device 10, the ignition switch 26 is disposed at the vehicle front side of the key cylinder 30. The ignition switch 26, the key cylinder 30 and the lock bar 22 are disposed efficiently along the longitudinal direction of the vehicle.

Accordingly, in the present steering lock device 10, the ignition switch 26, which is fixed to the lock body 12, does not project into the vehicle compartment, and does not unnecessarily encroach on the space within the vehicle compartment. Further, there are no constraints on the design of the outer shape of the column cover due to projecting-out of the ignition switch 26.

As described above, in accordance with the steering lock device of the present invention, the degrees of freedom in designing the outer shape of the column cover can be increased by keeping the amount by which the steering lock device projects from the steering column small.

What is claimed is:

1. A steering lock device comprising:
    a key cylinder which has a key rotor rotated by a key, and which is accommodated within a lock body mounted to a steering column of a vehicle;
    a gear accommodated within said lock body which rotates integrally with the key cylinder and which is disposed at a steering shaft side of said cylinder;
    a lock bar accommodated within the lock body, and moved, by rotation of the key rotor and said gear, between a locking position at which the lock bar locks a steering shaft, and an unlocking position at which the lock bar cancels the locking,
    wherein the lock bar is offset parallel to a central axis of the key cylinder, and is disposed at a key cylinder side along the central axis of the key cylinder, and
    wherein most of a length of said lock bar overlaps said key cylinder and said gear when said lock bar is in said unlocking position.

2. The steering lock device of claim 1, wherein an ignition switch, which is operated by the gear which rotates integrally with the key rotor, is provided at a side of the key cylinder which side is opposite the lock bar along a vehicle longitudinal direction.

3. The steering lock device of claim 1, wherein the lock bar is connected to the key rotor through said gear so as to reciprocate between the locking position and the unlocking position in accordance with rotation of the key rotor.

4. The steering lock device of claim 1, wherein a steering column side end of the key rotor and a proximal end of the lock bar are connected via a connecting member which includes the gear.

5. The steering lock device of claim 4, wherein the lock bar is urged toward the steering column.

6. The steering lock device of claim 5, wherein, when the key rotor rotates to an operation start position, due to the connecting member, the lock bar moves to the unlocking position at a side opposite the steering column along a direction of the central axis of the key cylinder, and is held at the unlocking position against urging force.

7. The steering lock device of claim 5, wherein, when the key rotor rotates to an operation stop position, holding of the lock bar at the unlocking position by the connecting member is cancelled, and the lock bar moves to the locking position at a steering column side along a direction of the central axis of the key cylinder by urging force, and is held at the locking position by urging force.

8. The steering lock device of claim 4, wherein the steering column side end of the key cylinder and the proximal end of the lock bar overlap one another when said lock bar is in said unlocking position when viewed in a direction orthogonal to the central axis of the key cylinder.

9. A steering lock device comprising:
    a key cylinder which has a key rotor rotated by a key, and which is accommodated within a lock body mounted to a steering column of a vehicle;
    a gear accommodated within said lock body on a steering shaft side of said key cylinder that rotates with said key cylinder;
    a lock bar accommodated within the lock body, and moved, by rotation of the key rotor, between a locking position at which the lock bar locks a steering shaft, and an unlocking position at which the lock bar cancels the locking,
    wherein the lock bar is offset parallel to a rotational axis of the key cylinder and is disposed over a side of said key cylinder,
    the lock bar is connected to the key rotor via a connecting member, so as to reciprocate between the locking position and the unlocking position in accordance with rotation of the key rotor, and
    the key cylinder and the lock bar at least partially overlap one another when said lock bar is in said unlocking position when viewed in a direction orthogonal to the rotational axis of the key cylinder, and most of a length of said lock bar overlaps said key cylinder and said gear in said unlocking position.

10. The steering lock device of claim 9, wherein an ignition switch, which is operated by the gear which rotates integrally with the key rotor, is provided at a side of the key cylinder which side is opposite the lock bar along a vehicle longitudinal direction.

11. The steering lock device of claim 9, wherein a gear, which rotates integrally with the key rotor, is provided at a steering column side end of the key rotor, and the steering column side end of the key rotor and a proximal end of the lock bar are connected via a connecting member which includes the gear.

12. The steering lock device of claim 11, wherein the lock bar is urged toward an interior of the lock body.

13. The steering lock device of claim 12, wherein, when the key rotor rotates to an operation start position, due to the connecting member, the lock bar moves to the unlocking position at a side opposite the steering column along a direction of the central axis of the key cylinder, and is held at the unlocking position against urging force.

14. The steering lock device of claim 12, wherein, when the key rotor rotates to an operation stop position, holding of the lock bar at the unlocking position by the connecting member is cancelled, and the lock bar moves to the locking position at a steering column side along a direction of the central axis of the key cylinder by urging force, and is held at the locking position by urging force.

15. A steering lock device comprising:
    a key cylinder which has a key rotor rotated by a key, and which is accommodated within a lock body mounted to a steering column of a vehicle;
    a lock bar accommodated within the lock body, and moved, by rotation of the key rotor, between a locking position at which the lock bar locks a steering shaft, and an unlocking position at which the lock bar cancels the locking,
    wherein the lock bar is offset parallel to a rotational axis of the key cylinder and is disposed over a side of said key cylinder,
    the lock bar is connected to the key rotor via a connecting member which includes a gear located at a steering shaft end of the key cylinder which rotates integrally with the key rotor, such that the lock bar moves parallel between the locking position and the unlocking position in accordance with rotation of the key rotor, the gear being supported directly at the lock body, wherein the key cylinder and the lock bar at least partially overlap one another when said lock bar is in said unlocking position when viewed in a direction orthogonal to the central axis of the key cylinder, and most of a length of said lock bar overlaps said key cylinder and said gear when viewed in said direction.

16. The steering lock device of claim 15, wherein an ignition switch, which is operated by the gear, is provided at a side of the key cylinder which side is opposite the lock bar along a vehicle longitudinal direction.

17. The steering lock device of claim 15, the steering column side end of the key rotor and a proximal end of the lock bar are connected via a connecting member which includes the gear.

* * * * *